(12) United States Patent
Yoshida et al.

(10) Patent No.: US 8,268,021 B2
(45) Date of Patent: Sep. 18, 2012

(54) SEALED BATTERY AND METHOD FOR MANUFACTURING THE SAME

(75) Inventors: Satoshi Yoshida, Moriguchi (JP); Eiji Okutani, Moriguchi (JP); Hironori Marubayashi, Moriguchi (JP); Hideyuki Inomata, Moriguchi (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 692 days.

(21) Appl. No.: 12/398,282

(22) Filed: Mar. 5, 2009

(65) Prior Publication Data

US 2009/0233168 A1    Sep. 17, 2009

(30) Foreign Application Priority Data

Mar. 11, 2008 (JP) ................. 2008-061019

(51) Int. Cl.
*H01M 4/82* (2006.01)
(52) U.S. Cl. ........................................ 29/623.1
(58) Field of Classification Search .......... 429/185; 29/623.1
See application file for complete search history.

(56) References Cited

U.S. PATENT DOCUMENTS

2007/0128514 A1* 6/2007 Yoshida ............. 429/185
2009/0035659 A1* 2/2009 Takeuchi et al. ........ 429/223

FOREIGN PATENT DOCUMENTS

| JP | 2000-268781 A | 9/2000 |
| JP | 2005-183360 A | 7/2005 |
| JP | 2006-019089 A | 1/2006 |

* cited by examiner

*Primary Examiner* — Patrick Ryan
*Assistant Examiner* — Muhammad Siddiquee
(74) *Attorney, Agent, or Firm* — Westerman, Hattori, Daniels & Adrian, LLP

(57) ABSTRACT

A method for manufacturing a sealed battery for the invention uses an outer can 15 with an opening and a sealing plate 16 provided with a rising part which rises perpendicularly from the middle of a flange on the entire circumference of or a part of the fitted face with the battery outer can 15. The method includes inserting the sealing plate 16 into the opening of the battery outer can 15 so that the top faces of both the battery outer can 15 and the flange of the sealing plate 16 are substantially in the same plane, and irradiating the fitted part of the opening of the battery outer can 15 and the sealing plate 16 with a high energy beam for welding.

2 Claims, 7 Drawing Sheets

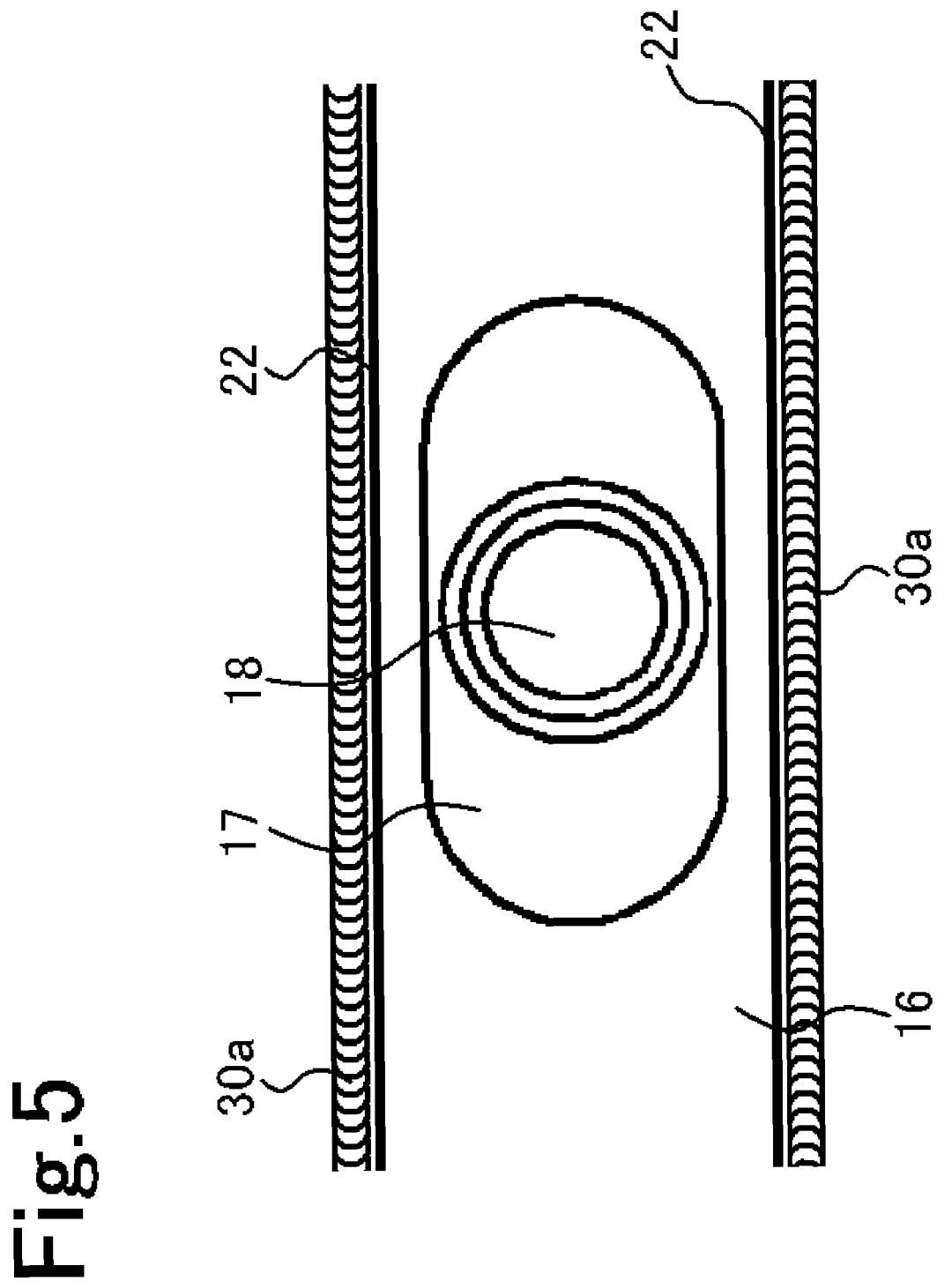

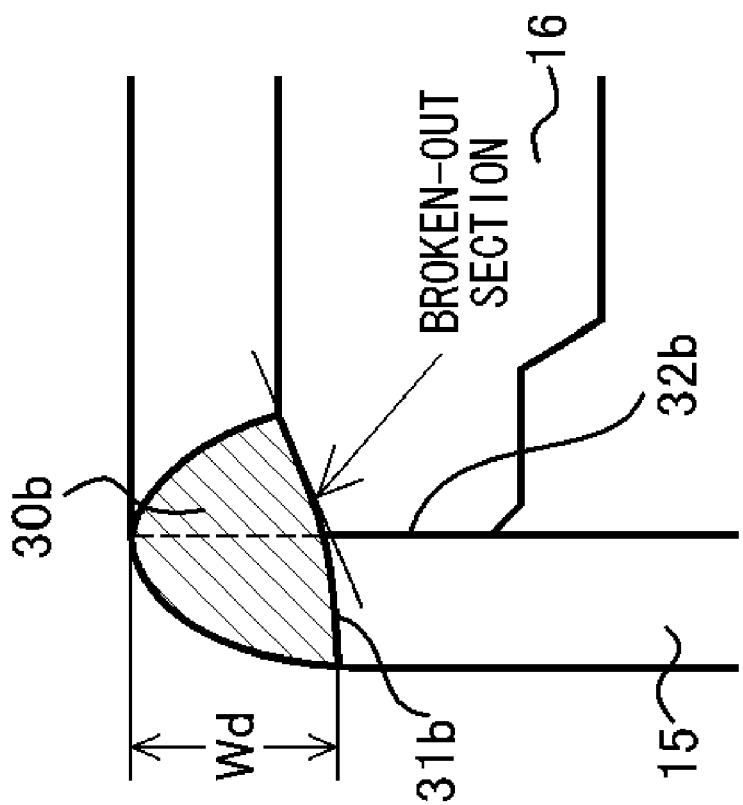
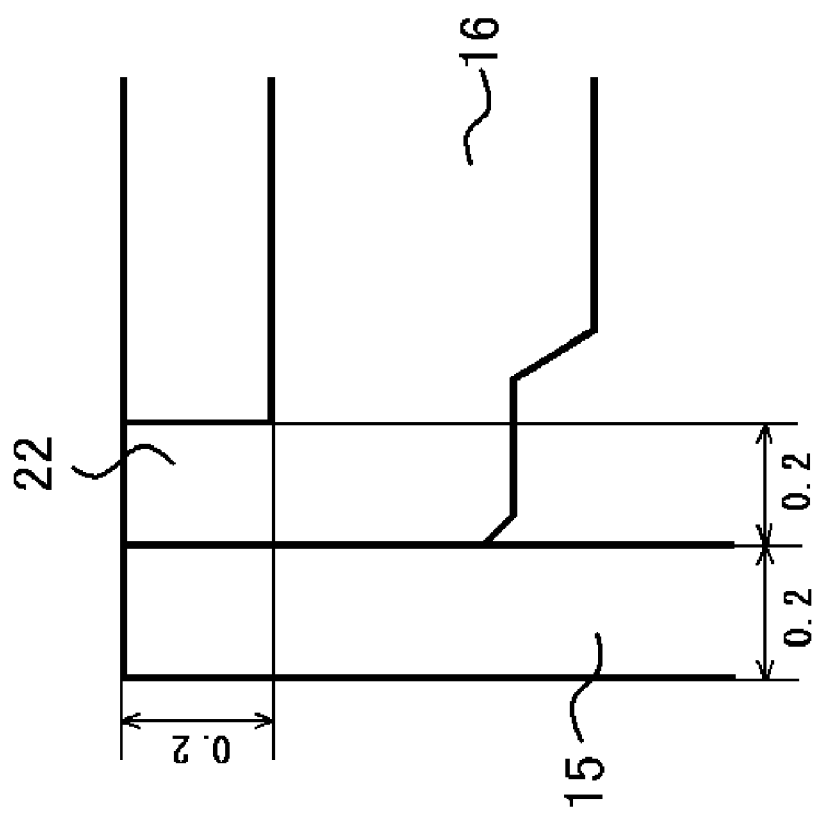

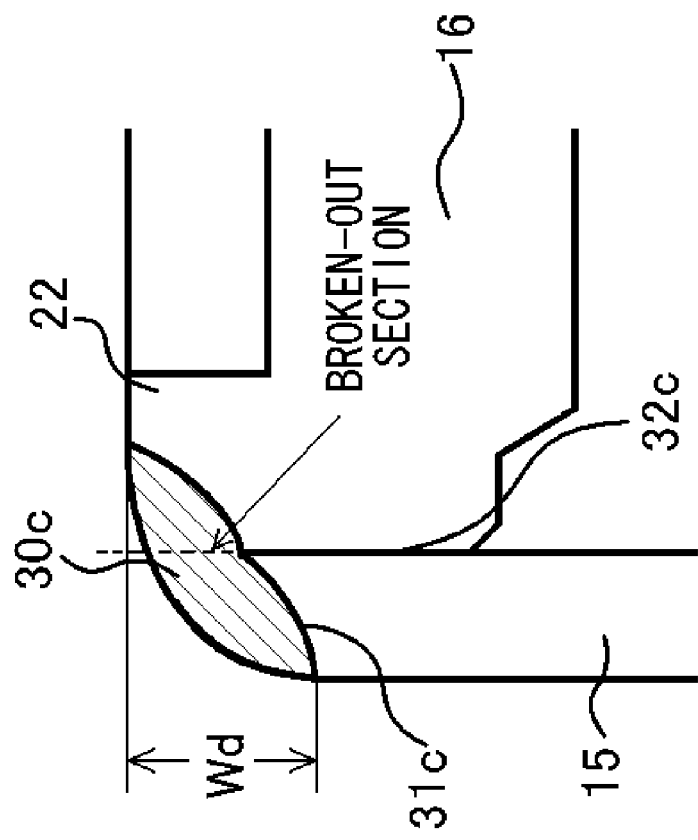
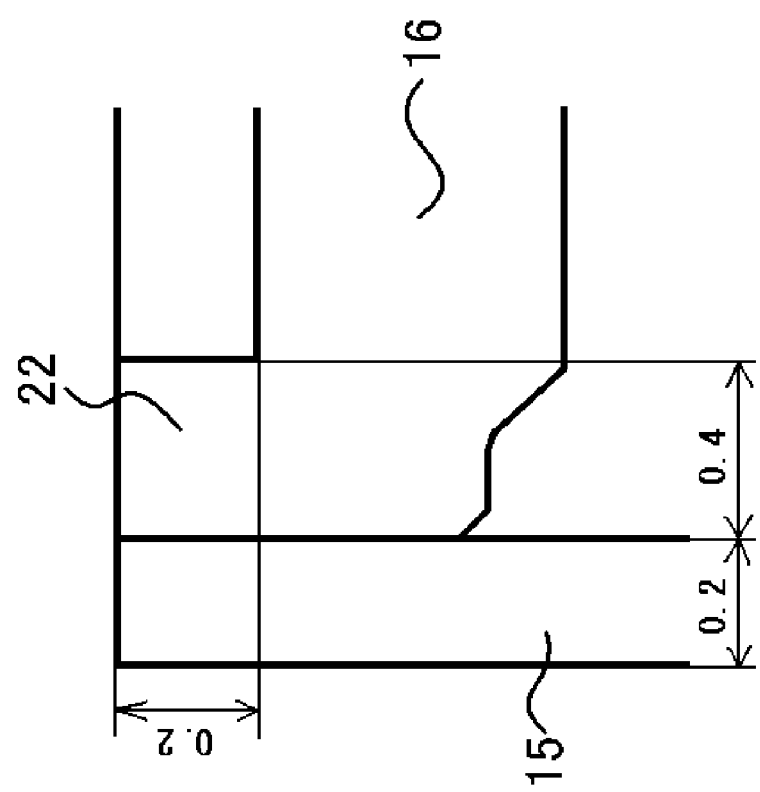

SEALED BATTERY AND METHOD FOR MANUFACTURING THE SAME

TECHNICAL FIELD

The present invention relates to a sealed battery and a method for manufacturing the same, and especially relates to a sealed battery in which the flange of a sealing plate fitted with an opening of a battery outer can is welded by a high energy beam such as a laser beam and the welded part has a high breaking strength, and a method for manufacturing the same.

BACKGROUND ART

In accordance with the rapid spread of portable electronic equipment, specifications required for batteries used in such equipment have become strict year after year. Especially, batteries with a compact and slim size, high-capacity, excellent cycle characteristics, and stable performance are required. In addition, in the field of secondary batteries, nickel hydrogen batteries and lithium nonaqueous electrolyte secondary batteries with higher energy density than other batteries have been drawing attention, and the market share of these secondary batteries in the secondary battery market has shown a large increase.

In equipment using this kind of secondary batteries, since a space for containing the battery is often prismatic (flat box shape), sealed secondary batteries manufactured by sealing prismatic battery outer cans containing electric power generating elements are often used. An example of the prismatic sealed secondary batteries will be described using FIGS. 1 to 3.

FIG. 1 is a perspective view showing a longitudinal section of a lithium nonaqueous electrolyte secondary battery as a prismatic sealed battery manufactured in the related art. FIG. 2 is a plan view showing a state where a sealing plate is fitted with a battery outer can. FIG. 3 is a schematic sectional view showing a state of laser welding of the battery outer can and the sealing plate.

A sealed secondary battery 10 is manufactured as follows: a positive electrode plate 12 and a negative electrode plate 11 with a separator 13 interposed therebetween are wound to form a flat spiral electrode 14; the electrode 14 is contained in a prismatic battery outer can 15; and the prismatic battery outer can 15 is sealed with a sealing plate 16. The flat spiral electrode 14 is wound so that the positive electrode plate 12 is positioned on the outermost periphery to be exposed, and the exposed positive electrode plate 12 on the outermost periphery contacts directly and is electrically connected to the inner surface of the prismatic battery outer can 15 also serving as a positive electrode terminal. Furthermore, the negative electrode plate 11 is electrically connected to a negative electrode terminal 18 which is formed at the center of a sealing plate 16 and is attached to the sealing plate through an insulator 17, through a collector 19. Then, since the prismatic battery outer can 15 is electrically connected to the positive electrode plate 12, in order to prevent short circuit between the negative electrode plate 11 and the prismatic battery outer can 15, an insulating spacer 20 is inserted between the upper end of the flat spiral electrode 14 and the sealing plate 16. Thus, the negative electrode plate 11 and the prismatic battery outer can 15 are in an electrically insulated state.

The prismatic nonaqueous electrolyte secondary battery is manufactured as follows: the flat spiral electrode 14 is inserted in the prismatic battery outer can 15; the sealing plate 16 is laser-welded to the opening of the prismatic battery outer can 15; a nonaqueous electrolyte is poured from an electrolyte injecting hole 21; and the electrolyte injecting hole 21 is sealed up. Such a method of fixing the sealing plate 16 to the prismatic outer can by laser welding is widely used due to the advantage that the opening of the battery outer can 15 can be sealed reliably without deterioration of volumetric efficiency (see JP-A-2000-268781, JP-A-2005-183360, and JP-A-2006-19089).

As for the laser welding between the battery outer can 15 and the sealing plate 16, as shown in FIG. 3, the battery outer can 15 and the sealing plate 16 are fitted so that both of the top faces are made horizontal, the integrated assembly is irradiated with a laser beam from above in a vertical direction, and the battery outer can and the sealing plate are melted and welded. As forming materials for the above-mentioned battery outer can 15 and the sealing plate 16, aluminum or an aluminum alloy with good thermal conductivity is used for low cost and the purpose of weight reduction.

When aluminum or the aluminum alloy with good thermal conductivity is used as a forming material for the battery outer can 15 and the sealing plate 16, if sufficient welded part between the battery outer can 15 and the sealing plate 16 is not formed, the joint strength can not be enhanced, and may lead to leakage of an electrolyte at the time of drop impact. One reason why such sufficient welded part cannot be formed is that melting patterns between the battery outer can 15 and the sealing plate 16 are different from each other because of the difference of the wall thicknesses between the battery outer can 15 and the sealing plate 16 on the fitted face or the difference of the materials thereof. Thus, stable sufficient welded part cannot be obtained.

The inventors performed intensive studies in order to solve the problem which occurs when such prismatic battery outer cans 15 and the sealing plate 16 are welded by a high energy beam such as a laser beam. As a result, they found that, considering the focusing diameter of the laser beam, by designing wall thicknesses of both the battery outer can 15 and the sealing plate 16 so as to melt their entire top faces, and furthermore, in order not to deteriorate the strength of the base metal of the sealing plate 16, by making the flange bottom thick enough and making the welded part of the prismatic battery outer can 15 and the sealing plate 16 to weld sufficiently, the strength of the welded part is improved and the base metal strength of the periphery can be maintained, whereby a sealed battery with high fall resistance reliability can be obtained.

SUMMARY

That is, an advantage of some aspects of the invention is to provide a sealed battery with excellent fall resistance reliability and capable of inhibiting an electrolyte leak at the time of being subject to impact, while maintaining the strength of the peripheral base metal as well as having enough joint strength by causing sufficient welding, which is formed into a sufficient welded part between a battery outer can and a sealing plate.

According to a first aspect of the present invention, a sealed battery of the above aspect of the invention includes a battery outer can and a sealing plate for sealing an opening of the battery outer can, a fitted face of the battery outer can and the sealing plate being joined by a high energy beam welding. A cross section of a welded part of the battery outer can and the sealing plate is mound shape that is raised from a bottom face of a melted and solidified part toward the outside of the battery outer can and has a top located on a fitted line of the battery outer can and the sealing plate, and a melted and solidified part on the battery outer can side and the sealing plate side is, at the bottom face thereof, on the same face and substantially parallel to a top face of the sealing plate and is formed to be led to a tapered part on a top face side of a flange of the sealing plate.

In the sealed battery of the above aspect of the invention, since the cross section of the welded part of the outer can and the sealing plate is the mound shape which starts from the outside of the battery outer can on the bottom face of the melted and solidified part and has its top on the fitted line of the battery outer can and the sealing plate, the distance between the surface of the melted and solidified part and the fitted position of the battery outer can and the sealing plate is long. In addition, in the sealed battery of the above aspect of the invention, the flange base of the sealing plate does not melt and the base metal strength is maintained, so that the welded part has enough strength. Thus, according to the sealed battery of the above aspect of the invention, even if the battery is subjected to drop impact and the like, breaking at the boundary between the base metal of the sealing plate and the welded part or a crack in the welded part is unlikely to occur, so that a sealed battery with excellent fall resistance reliability, less electrolyte leakage at the moment of impact, and high safety, can be obtained. In the above aspect of the invention, the term, "substantially parallel", includes states which are not necessarily completely parallel but apparently close to parallel.

Furthermore, in the sealed battery of the above aspect of the invention, it is preferable that the battery outer can and the sealing plate are made of aluminum or an aluminum alloy.

The aluminum and the aluminum alloy are low cost and lightweight, but have high thermal conductivity. Thus, in related-art examples, in a welded part of a battery outer can and a sealing plate made of the aluminum and the aluminum alloy, since sufficient welded part cannot be formed, the welding strength cannot be enhanced, so that an electrolyte is apt to leak at the moment of drop impact. In contrast, in the sealed battery of the above aspect of the invention, since the battery outer can and the sealing plate are welded sufficiently, the strength of the welded part is improved and the strength of the peripheral base metal can be maintained, so that a low cost and lightweight sealed battery with excellent fall resistance reliability is realized.

Furthermore, a method for manufacturing a sealed battery of the above aspect of the invention includes a battery outer can and a sealing plate having a terminal part, and having a flange on all circumferences of or a part of a fitted face with the battery outer can. The wall thickness at a top face of a leading end of the flange is thinner than that at a base of the flange and the wall thickness is constant. The flange has a perpendicular part from the top face toward a bottom part and a tapered part formed next to the perpendicular part which has a base wider than the perpendicular part. The method includes welding an electrode body to the terminal part of the sealing plate, inserting the electrode body into the battery outer can and simultaneously aligning top faces of the battery outer can and the sealing plate in a same plane, and welding a fitting part of the battery outer can and the sealing plate with high energy beam irradiation while focusing on the fitted part.

The sealing plate used for the method for manufacturing the sealed battery of the above aspect of the invention has the flange on the fitted face with the battery outer can. The wall thickness at the top face on the leading end of the flange is thinner than that at the base and is constant. The flange has a perpendicular part from the top face toward the bottom part and a tapered part formed next to a perpendicular part which has a base wider than the perpendicular part. When the sealing plate is fitted to the battery outer can, and the top faces of the battery outer can and the sealing plate are aligned in the same plane, and then the battery outer can and the sealing plate are welded with high energy beam irradiation while focusing on the fitting part thereof, the battery outer can and the perpendicular part from the top face toward the bottom part of the flange of the sealing plate melt and a part of the tapered part of the flange of the sealing plate on the top face side melts. However, since the wall thickness of the tapered part of the flange of the sealing plate gradually becomes thick, the temperature decreases due to the thermal conductivity, so that the melting stops on the middle of the tapered part. That is, the flange base of the sealing plate does not melt.

Accordingly, if the method for manufacturing the sealed battery of the above aspect of the invention is employed, the cross section of the welded part of the outer can and the sealing plate becomes the mound shape that is raised from a bottom face of a melted and solidified part toward the outside the battery outer can and has its top located on the fitted line of the battery outer can and the sealing plate, and the flange base of the sealing plate does not melt. Thus, according to the method for manufacturing the sealed battery of the above aspect of the invention, since the battery outer can and the sealing plate are welded sufficiently, the strength of the welded part is strong, and the strength of the peripheral base metal can be maintained, so that a low cost and lightweight sealed battery with excellent fall resistance reliability can be obtained.

In the method for manufacturing the sealed battery of the above aspect of the invention, as the high energy beam, not only a laser beam but also an electron beam may be used.

Furthermore, in the method for manufacturing the sealed battery of the above aspect of the invention, it is preferable that the battery outer can and the sealing plate are both made of aluminum or an aluminum alloy, the battery outer can has a wall thickness of 0.2 to 0.3 mm, the flange of the sealing plate has a total height of 0.2 to 0.3 mm, the leading end of the flange has a wall thickness of 0.2 to 0.35 mm and a height of 0.05 to 0.15 mm, and the thickest part of the flange base has a wall thickness of 0.4 to 0.45 mm.

If the opening of the battery outer can has a wall thickness of less than 0.2 mm, the strength of the battery outer can becomes weak, and if the opening has a wall thickness of more than 0.3 mm, since the melt depth of the battery outer can becomes shallow, the strength of the welded part deteriorates. Furthermore, if the flange part of the sealing plate has a total height of less than 0.2 mm, since the thermal conductivity to the base metal of the sealing plate is too large, and the melt depth becomes shallow, the strength of the welded part deteriorates, and if the flange has a total height of more than 0.3 mm, the internal volume of the sealed battery decreases. Furthermore, if the leading end of the flange of the sealing plate has a wall thickness of less than 0.2 mm, since the height of the mound shape of the melted and solidified part becomes low, the strength of the welded part deteriorates, and if the leading end has a wall thickness of more than 0.35 mm, since the spot diameter of the laser beam is around 0.6 mm, the tapered part of the flange dose not melt, and the strength of the welded part deteriorates.

Furthermore, if the leading end of the sealing plate has a height of less than 0.05 mm, the flange of the sealing plate is substantially the same as the flange without a leading end being formed, and if the leading end has a height of more than 0.15 mm, since the whole of the leading end of the flange of the sealing plate may not melt, the strength of the welded part deteriorates. Furthermore, if the bottom of the flange of the sealing plate has a wall thickness of less than 0.4 mm, the strength of the sealing plate base metal is hard to maintain, and if the base has a wall thickness of more than 0.45 mm, the thermal diffusion to the sealing plate base metal becomes large, so that the effect of thermal concentration to the flange decreases.

BRIEF DESCRIPTION OF THE DRAWINGS

The invention will be described with reference to the accompanying drawings, wherein like numbers reference like elements.

FIG. 5 is a partially enlarged plan view showing the state after the welding in Example.

FIG. 6A is a schematic sectional view showing the state before welding in First Comparative Example, and FIG. 6B is a schematic sectional view showing the state after the welding in First Comparative Example.

FIG. 7A is a schematic sectional view showing the state before welding in Second Comparative Example, and FIG. 7B is a schematic sectional view showing the state after the welding in Second Comparative Example.

DESCRIPTION OF EXEMPLARY EMBODIMENTS

Hereinafter, exemplary embodiments of the invention will be described in detail with examples and comparative examples of taking a prismatic sealed battery and the case using a laser beam as a high energy beam. However, the example described below is an illustrative example for embodying the technical concept of the invention, is not intended to limit the invention to the example, and may be equally applied to various modified batteries and methods, for example the case using an electron beam as a high energy beam, without departing from the technical concept described in the appended claims.

Figure 4B:
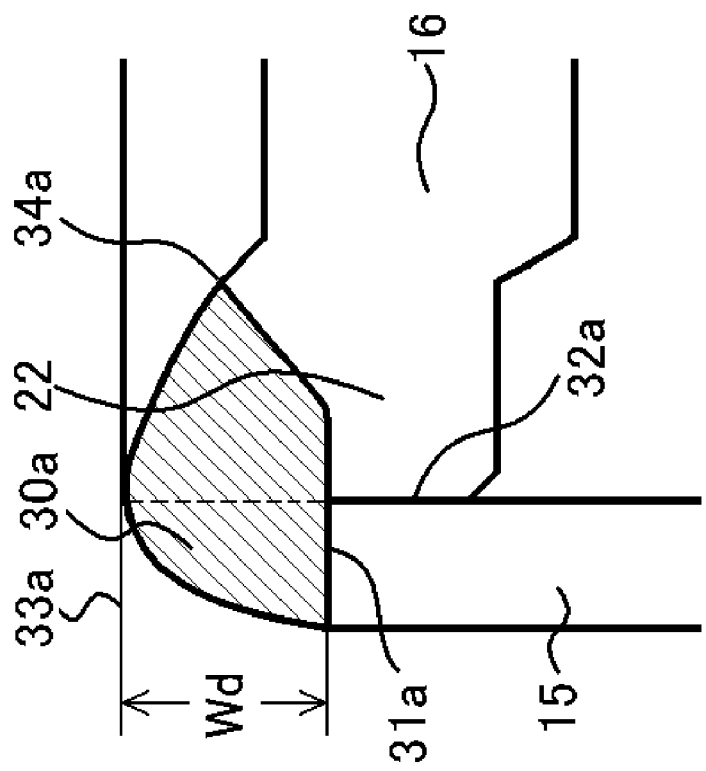
FIG. 4B is a schematic sectional view showing the state after the welding in Example.
Figure 4A:
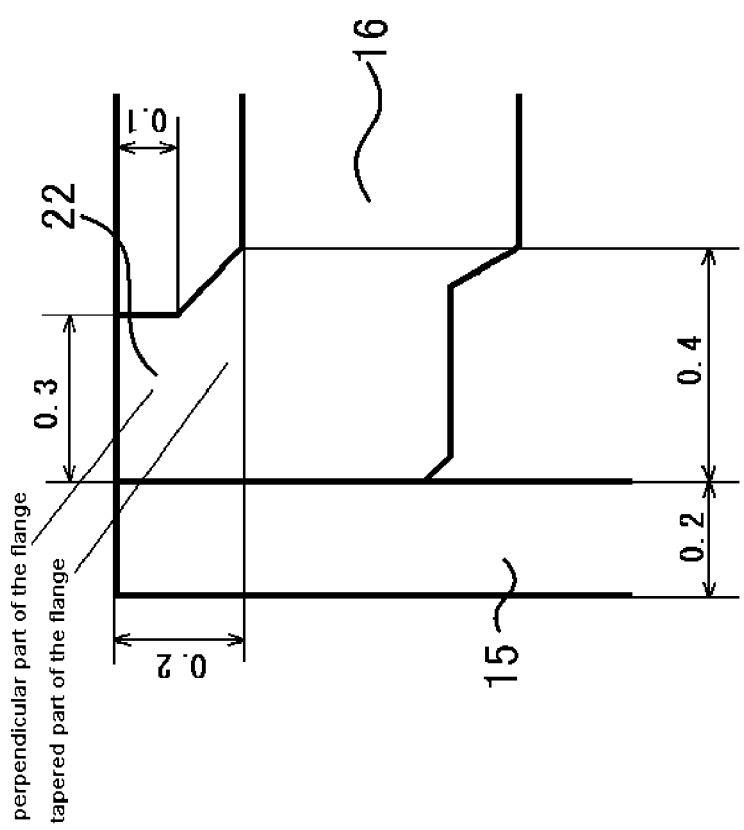
FIG. 4A is a schematic sectional view showing the state before welding in Example.

FIG. 4A is a schematic sectional view showing the state before welding in Example, and FIG. 4B is a schematic sectional view showing the state after the welding in Example. FIG. 5 is a partially enlarged plan view showing the state after the welding in Example. FIG. 6A is a schematic sectional view showing the state before welding in First Comparative Example, and FIG. 6B is a schematic sectional view showing the state after the welding in First Comparative Example. FIG. 7A is a schematic sectional view showing the state before welding in Second Comparative Example, and FIG. 7B is a schematic sectional view showing the state after the welding in Second Comparative Example.

Figure 1:
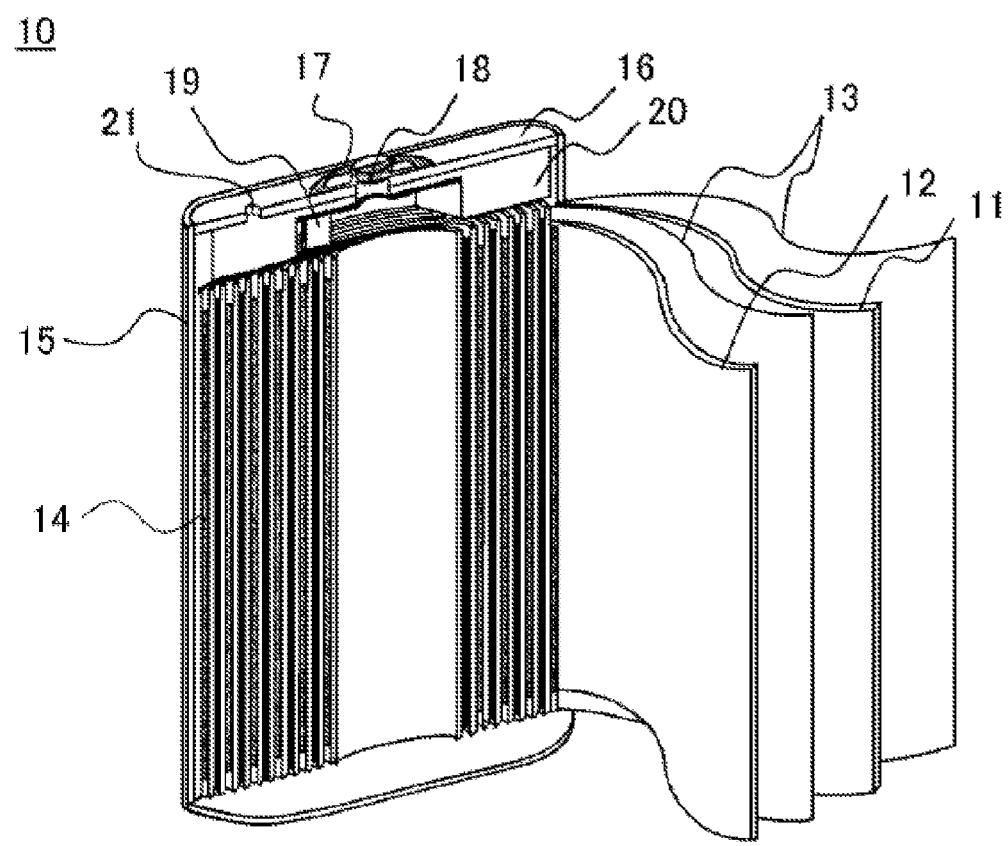
FIG. 1 is a perspective view showing a longitudinal section of a lithium nonaqueous electrolyte secondary battery as a prismatic sealed battery.
Figure 2:
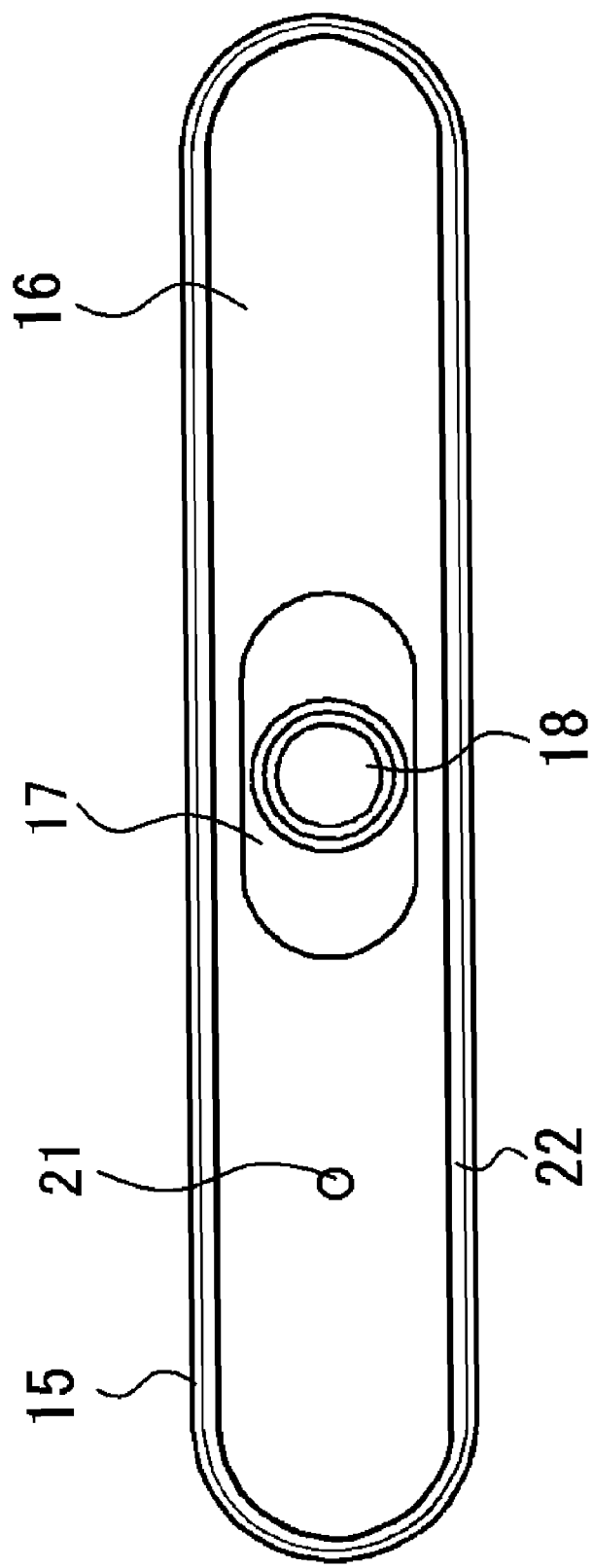
FIG. 2 is a plan view showing the state where a sealing plate is fitted with a battery outer can.
Figure 3:
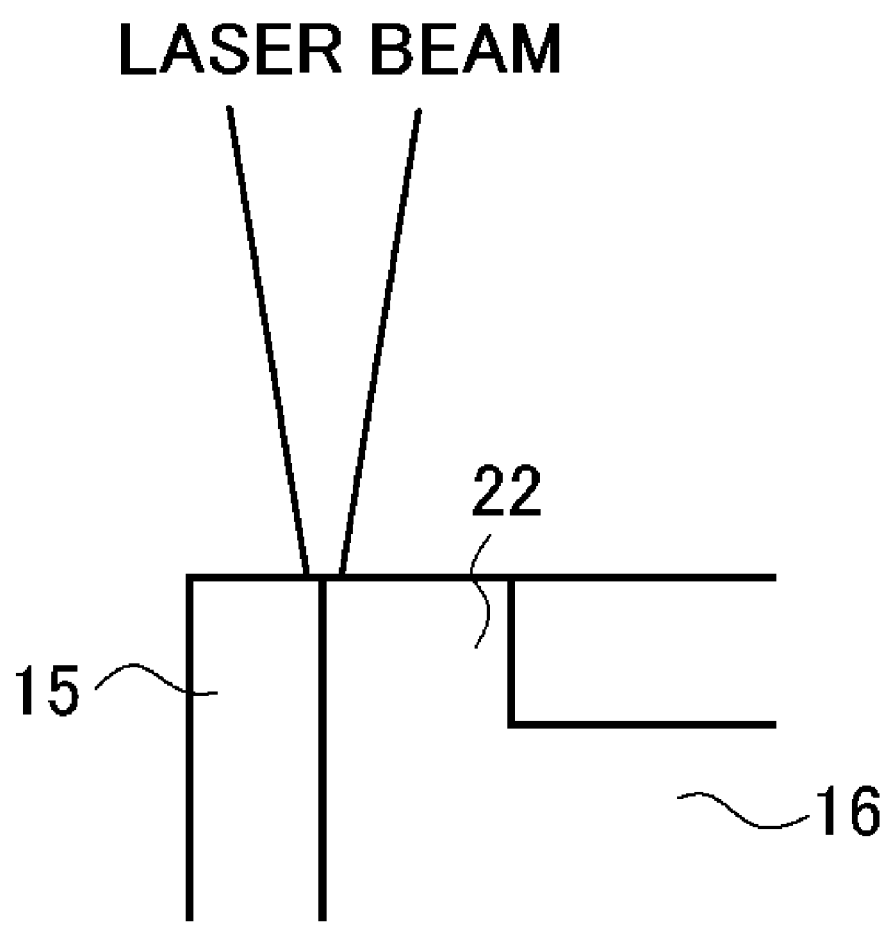
FIG. 3 is a schematic sectional view showing the state where the battery outer can and the sealing plate are laser-welded.

In Example and First and Second Comparative Examples, a prismatic battery outer can and a sealing plate having shapes similar to those shown in FIGS. 1 and 2 were used, and in FIGS. 4 to 7, the identical elements as in FIGS. 1 and 2 are represented by the same reference mark as in FIGS. 1 and 2 to be explained.

Here, in each Example and First and Second Comparative Examples, a prismatic battery outer can 15 having a width of the top face of 0.2 mm was used. Furthermore, as a sealing plate 16, a substantially rectangular sealing plate 16 made of a pure aluminum shown in FIGS. 1 and 2 was used. The sealing plate 16 had a flange 22 on its periphery and an electrolyte injecting hole 21, and was provided with a negative electrode terminal 18 attached at the central part with an insulator 17 interposed. In First and Second Comparative Examples, sealing plates with the same material and the same size as the sealing plate 16 in Example were used except for having the flange 22 with different shapes from that in Example.

That is, the structure difference between the flanges of First and Second Comparative Examples was as follows: the flange 22 of First Comparative Example had a wall thickness of 0.2 mm which was the same width as that of the top face of the battery outer can 15; on the other hand, the flange 22 of Second Comparative Example had a wall thickness of 0.4 mm, which was two times the width of the top face of the battery outer can 15. However, the sizes of all of the other parts were the same and neither of the flanges 22 of First and Second Comparative Examples had a tapered part. On the contrary, the flange 22 of the sealing plate 16 in Example had a wall thickness of 0.3 mm, which was between those of First and Second Comparative Examples, and had a tapered part, and the whole width of the flange including the tapered part was 0.4 mm, which was the same as that in Second Comparative Example.

Each of the specific structures and the sizes of the battery outer cans 15 and the flanges 22 in Example and First and Second Comparative Examples is shown in FIGS. 4A, 6A, and 7A. All units of numerals described in these drawings are "mm". Then, in each of Example and First and Second Comparative Examples, the sealing plate was attached to an inner edge of the opening of the predetermined sized outer can 15 with a wall thickness of 0.20 mm so that both top faces became flat, fifteen pieces of each dummy battery without an electrode body and an electrolyte were prepared, then the overall circumference of the joint area between the sealing plate 16 and the battery outer can 15 was welded by a pulse laser beam from the top face side of the flange 22. Cross section shapes of the welded parts after the welding in Example and First and Second Comparative Examples are shown in FIGS. 4B, 6B, and 7B, respectively, and a partially enlarged plan view after the welding in Example is shown in FIG. 5. The outer dimensions of each of the manufactured dummy batteries were 5.8 mm (thickness)×34 mm (width)×43 mm (height).

Ten pieces of each dummy battery after the welding were cut down beside the negative electrode terminal 18 perpendicularly, and each of the welding depths Wd of the melted and solidified parts on the cross sections was measured. Furthermore, for 5 pieces of each dummy battery of Example and First and Second Comparative Examples, each of the negative electrode terminals was pressurized by using a round bar with a leading end diameter of 3 mm and a load (the maximum applied load was 500 N) and a displacement when the battery was broken were measured to determine the strength of the welded part (the test is referred to as the push-in test). The summarized results are shown in Table 1. In Table 1, the upper values represent the mean values and the values in parentheses show the measured ranges.

TABLE 1

|  | Example | Comparative Example 1 | Comparative Example 2 |
|---|---|---|---|
| Welding depth n = 10 P | 0.278 mm (0.250 to 0.318) | 0.270 mm (0.239 to 0.314) | 0.204 mm (0.186 to 0.248) |
| Load at the time of breakage n = 5 P | All 500 N or more | 430 N (396 to 450) | 383 N (356 to 422) |

Furthermore, 15 pieces of each battery were manufactured by the following method: each sealing plate of Example and First and Second Comparative Examples was attached to an electrode body, and the electrode body was inserted into the outer can and the sealing plate was fitted to the opening of the outer can. The outer can and the sealing plate were welded with a pulse laser beam, then an electrolyte was poured, and the battery was sealed. Among them, 10 pieces of each battery were subjected to a drop test under condition 1 (the batteries were dropped from a height of 1 m to a surface of an iron plate in a random manner), and 5 pieces of each battery were subjected to a drop test under condition 2 (the batteries were dropped from a height of 30 cm to a surface of an iron plate with the negative terminal facing downward). The summarized results are shown in Table 2. In Table 2, the upper values represent the mean values, and the values in parentheses show the measured ranges.

TABLE 2

|  | Example | Comparative Example 1 | Comparative Example 2 |
|---|---|---|---|
| Condition I n = 10 P | All cleared 500 times | 400 times (250 to 600) | 270 times (150 to 450) |
| Condition II n = 5 P | All cleared 500 times | 140 times (90 to 180) | 250 times (170 to 300) |

As shown in FIG. 4B, the cross section of a welded part 30a of the dummy battery in Example is a mound shape that is raised from a bottom face of a melted and solidified part 31a toward the outside of the battery outer can 15 and has its top located on a fitted line 32a of the battery outer can 15 and the sealing plate 16, and the melted and solidified part on the battery outer can 15 side and that on the sealing plate 16 side are, at the melted and solidified part 31a, on the same face and substantially parallel to the top face 33a of the sealing plate 16 and led to a tapered part 34a on the top face side of the flange of the sealing plate 16. On the other hand, in the cross section of a welded part 30b of the dummy battery in First Comparative Example, as shown in FIG. 6B, since the flange 22 of the sealing plate 16 has the same width as that of the battery outer can 15, the whole flange 22 melts and the bottom face of the melted and solidified part 31b is inclined downward from the flange 22 side toward the battery outer can 15 side. Furthermore, in the cross section of a welded part 30c of the dummy battery in Second Comparative Example, as shown in FIG. 7B, since the flange 22 of the sealing plate 16 has a wider width than that of the battery outer can 15, the flange 22 melts only partly. In addition, the bottom face of the melted and solidified part 31c of the welded part 30c in Second Comparative Example is inclined downward from the flange 22 side toward the battery outer can 15 side and has an inflection point at the position of a fitted line 32c of the battery outer can 15 and the sealing plate 16.

Furthermore, the following are found from the results shown in Table 1. The welding depth Wd of First Comparative Example is much larger than that of Second Comparative Example, and that of Example is a little larger than that of First Comparative Example. On the other hand, as for the push-in test result, all the batteries in Example were not broken under a load of 500 N or less, but the batteries in First Comparative Example were broken under a load of 430 N and the batteries in Second Comparative Example were broken under a load of 383 N. Furthermore, all broken-out sections in First Comparative Example were in the base metal of the sealing plate 16, and all broken-out sections in Second Comparative Example were in the welded part 30c.

That is, in First Comparative Example, the strength of the welded part was improved, but the base metal of the sealing plate 16 was broken because the wall thickness of the flange 22 is thin. Accordingly, when the flange 22 has no tapered part being formed, from the viewpoint of the strength of the base metal of the sealing plate, it is preferred that the flange 22 of the sealing plate 16 has a wall thickness of 0.2 mm or more, but when the flange 22 has a wall thickness of 0.4 mm, the strength of the welded part deteriorates, conversely. Thus, when the tapered part is formed in the flange 22, considering the spot diameter of the laser beam is around 0.6 mm, in order to melt the tapered part of the flange 22, it is preferred that the upper limit of the wall thickness of the leading end of the flange 22 of the sealing plate 16 is 0.35 mm.

Furthermore, from the results shown in Table 2, the following are found. That is, in the result of the random drop test under condition 1, in the case of Example, when the batteries were dropped 500 times, the electrolyte did not leak from any batteries, but in First Comparative Example, the electrolyte leaked when the batteries were dropped 400 times on average, and in Second Comparative Example, the electrolyte leaked when the batteries were dropped 270 times on average. On the other hand, under condition 2 when dropping onto the negative electrode terminal side, in the case of Example, when the batteries were dropped 500 times, the electrolyte did not leak from any batteries, but in First Comparative Example, the electrolyte leaked when the batteries were dropped 140 times on average, and in Second Comparative Example, the electrolyte leaked when the batteries were dropped 250 times on average. In all broken batteries of First Comparative Example, the electrolyte leaked from the broken position of the base metal of the sealing plate 16, and in all broken batteries of Second Comparative Example, the electrolyte leaked from the broken position of the welded part 30a. Also from the results, since the strength of the welded part of First Comparative Example was improved, the wall thickness of the flange 22 was thin and the strength of the base metal was insufficient, so the base metal of the sealing plate 16 was broken to leak the electrolyte. On the other hand, in Example, it is found that the whole of the leading end of the flange 22 melted and the wall thickness of the base was sufficient, so that both the welded part and the sealing plate base metal had sufficient strength.

In Example and First and Second Comparative Examples, a battery outer can 15 with an opening wall thickness of 0.2 mm was used, but if the battery outer can 15 has a thickness of less than 0.2 mm, the strength of the obtained battery becomes weak, and if the battery outer can 15 has a thickness of more than 0.3 mm, since the melt depth of the battery outer can 15 becomes shallow, the strength of the welded part deteriorates. Thus, it is preferred that the opening wall thickness of the battery outer can 15 is in a range of 0.2 to 0.3 mm. Furthermore, if the flange part of the sealing plate has a total height of less than 0.2 mm, since the thermal conductivity to the base metal of the sealing plate 16 is too large and the melt depth becomes shallow, the strength of the welded part deteriorates, and if the flange part has a total height of more than 0.3 mm, the internal volume of the sealed battery is reduced. Thus, it is preferred that the total height of the flange part of the sealing plate is in a range of 0.2 to 0.3 mm.

Furthermore, if the leading end of the flange 22 of the sealing plate 16 has a wall thickness of less than 0.2 mm, since the height of the mound shape of the melted and solidified part becomes low, the strength of the welded part deteriorates, and if the leading end has a wall thickness of more than 0.35 mm, since the spot diameter of the laser beam is around 0.6 mm, the tapered part of the flange dose not melt, so that the strength of the welded part deteriorates. Thus, it is preferred that the leading end of the flange 22 of the sealing plate 16 has a wall thickness of 0.2 to 0.35 mm. Furthermore, if the leading end of the sealing plate 16 has a height of less than 0.05 mm, the flange of the sealing plate is substantially the same as a flange without a leading end being formed, and if the leading end has a height of more than 0.15 mm, since the whole of the leading end of the flange of the sealing plate may not melt, the strength of the welded part deteriorates. Thus, it is preferred that the leading end of the sealing plate 16 has a height of 0.05 to 0.15 mm.

Furthermore, if the base of the flange of the sealing plate has a wall thickness of less than 0.4 mm, it is difficult to maintain the strength of the base metal, and if the base has a wall thickness of more than 0.45 mm, the thermal conductivity to the base metal of the sealing plate becomes large and the effect of thermal concentration to the flange part becomes small. Thus, it is preferred that the base of the flange of the sealing plate has a wall thickness of 0.4 to 0.45 mm.

In the above experiments, the laser welding method was employed as a welding method, but the welding method is not limited and well-known high energy beams such as electron beam welding may be used. Furthermore, in Example, an example where the shape of the flange is improved over the entire circumference of the sealing plate is shown, but the shape may be provided intermittently.

What is claimed is:

1. A method for manufacturing a sealed battery comprising the steps of:
   providing
      a battery outer can and
      a sealing plate provided with a terminal part, the sealing plate having a flange on a fitted face with the battery outer can, the wall thickness at a top face of a leading end of the flange being thinner than the wall thickness at a lower base of the flange, the wall thickness being substantially uniform along a circumferential direction, and the flange having a perpendicular part from the top face toward a bottom part and a tapered part formed next to the perpendicular part which has a base wider than the perpendicular part;
   welding an electrode body to the terminal part of the sealing plate;
   inserting the electrode body into the battery outer can and aligning top faces of both the battery outer can and the sealing plate in a same plane; and
   welding a fitting part of the battery outer can and the sealing plate with high energy beam irradiation while focusing on the fitted part.

2. The method for manufacturing the sealed battery according to claim 1, wherein
   the battery outer can and the sealing plate are both made of aluminum or an aluminum alloy;
   an opening of the battery outer can has a wall thickness of 0.2 to 0.3 mm; and
   the flange of the sealing plate has a total height of 0.2 to 0.3 mm, the leading end of the flange has a wall thickness of 0.2 to 0.35 mm and a height of 0.05 to 0.15 mm, and the thickest part of the flange base has a wall thickness of 0.4 to 0.45 mm.

* * * * *